United States Patent [19]

Aulbach et al.

[11] Patent Number: 5,602,219
[45] Date of Patent: Feb. 11, 1997

[54] PROCESS FOR PREPARING CYCLOOLEFIN COPOLYMERS

[75] Inventors: Michael Aulbach, Hofheim; Michael-Joachim Brekner, Frankfurt; Frank Küber, Oberursel; Frank Osan, Kelkheim; Thomas Weller, Mainz; Jürgen Rohrmann, Kelkheim, all of Germany

[73] Assignee: Hoechst Aktiengesellschaft, Germany

[21] Appl. No.: 446,414

[22] Filed: May 22, 1995

Related U.S. Application Data

[63] Continuation of Ser. No. 195,558, Feb. 14, 1994, abandoned.

[30] Foreign Application Priority Data

Feb. 12, 1993 [DE] Germany .................... 43 04 307.0

[51] Int. Cl.$^6$ ............... C08F 4/62; C08F 232/08
[52] U.S. Cl. ............ 526/160; 526/127; 526/132; 526/183; 526/185; 526/188; 526/190; 526/194; 526/281; 526/308; 526/348; 526/943
[58] Field of Search ................... 526/160, 943, 526/281, 127, 308

[56] References Cited

U.S. PATENT DOCUMENTS 5,017,714  5/1991  Welborn, Jr. .

5,087,677  2/1992  Brekner et al. .
5,278,264  1/1994  Spaleck et al. .

FOREIGN PATENT DOCUMENTS

| 11465 | 9/1992 | Australia . |
| 11465/92 | 9/1992 | Australia . |
| 2055397 | 5/1992 | Canada . |
| 1317411 | 5/1993 | Canada . |
| 302424 | 2/1989 | European Pat. Off. . |
| 0407870 | 1/1991 | European Pat. Off. . |
| 0485893 | 5/1992 | European Pat. Off. . |
| 0503422 | 9/1992 | European Pat. Off. . |

Primary Examiner—Fred Zitomer
Attorney, Agent, or Firm—Connolly & Hutz

[57] ABSTRACT

Transparent cycloolefin copolymers having a high tensile strength are obtained by polymerization of a polycyclic olefin, ethylene and, if desired, an acyclic olefin and/or a monocylcic olefin in the presence of a catalyst system which comprises a cocatalyst and an asymmetrical metallocene compound of the formula

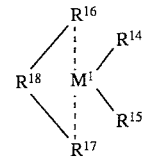

in which $R^{16}$ is cyclopentadienyl and $R^{17}$ is indenyl.

14 Claims, No Drawings

PROCESS FOR PREPARING CYCLOOLEFIN COPOLYMERS

This is a continuation of Ser. No. 08/195,558 filed Feb. 14, 1994, now abandoned.

DESCRIPTION

The invention relates to a process for preparing transparent cycloolefin copolymers having high tensile strengths.

It is known from the literature that cycloolefin homopolymers and copolymers can be prepared using metallocene/aluminoxane catalyst systems. The polymerization proceeds with retention of the rings and can be carried out in solvents or in bulk. The solvents used are, for example, hydrocarbons.

Cycloolefin copolymers can be prepared with a high cycloolefin content and then possess a high glass transition temperature. Associated therewith is a high thermal shape stability, which is why these polymers are suitable for use as thermoplastic molding compounds.

In cycloolefin copolymers prepared by means of metallocene technology, two series of properties can be distinguished. Cycloolefin copolymers prepared using metallocenes having mirror symmetry have relatively low tensile strengths. In comparison, cycloolefin copolymers prepared using metallocenes having $C_2$ symmetry have high tensile strengths (see Table 2). However, it is found that, in the polymerization of cycloolefins in the presence of ethylene, metallocenes having $C_2$ symmetry also form partly crystalline ethylene polymers which significantly impair the transparency of such products. Therefore, in the preparation of transparent cycloolefin polymers having the high tensile strengths of the cycloolefin polymers preparing using metallocenes with $C_2$ symmetry, an additional workup of the crude product, for example a multistage filtration (as described in EP 447 072) in which the partly crystalline ethylene polymers formed are removed, is unavoidable.

It is an object of the invention to find a process which gives ethylene-containing cycloolefin copolymers which have similarly high tensile strengths to the cycloolefin copolymers produced using metallocenes with $C_2$ symmetry but are nevertheless transparent.

It has been found that this object can be achieved by the use of specific asymmetrical metallocenes.

The polymerization is carried out in the liquid cycloolefin itself or in cycloolefin solution, with the pressure advantageously above 1 bar.

The invention thus provides a process for preparing a cycloolefin copolymer by polymerization of from 0.1 to 99.9% by weight, based on the total amount of monomers, of at least one polycyclic olefin of the formula I, II, III, IV, V or VI

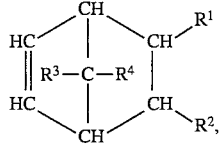
(I)

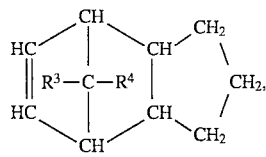
(II)

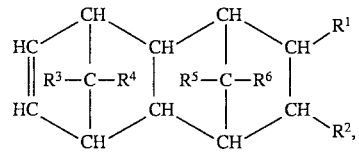
(III)

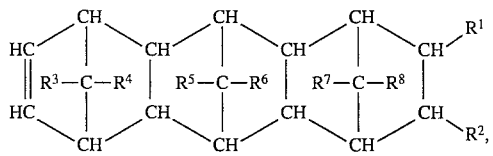
(IV)

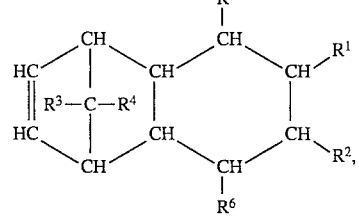
(V)

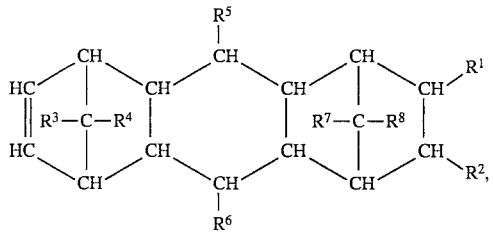
(VI)

in which $R^1$, $R^2$, $R^3$, $R^4$, $R^5$, $R^6$, $R^7$ and $R^8$ are identical or different and are a hydrocarbon atom or a hydrocarbon radical, where identical radicals in the various formulae can have different meanings,
from 0 to 99.9% by weight, based on the total amount of monomers, of a cycloolefin of the formula VII

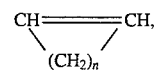
(VII)

in which n is from 2 to 10, from 0.1 to 99.9% by weight, based on the total amount of monomers, of ethylene and from 0 to 99.9% by weight, based on the total amount of monomers, of at least one acyclic 1-olefin of the formula VIII

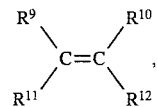
(VIII)

in which $R^9$, $R^{10}$, $R^{11}$ and $R^{12}$ are identical or different and are a hydrogen atom or a hydrocarbon radical, at temperatures from −78° to 150° C. and a pressure from 0.01 to 64 bar, in the presence of a catalyst which comprises at least one cocatalyst and at least one metallocene of the formula XI

in which

M$^1$ is titanium, zirconium, hafnium, vanadium, niobium or tantalum,

R$^{14}$ and R$^{15}$ are identical or different and are a hydrogen atom, a halogen atom, a C$_1$–C$_{10}$-alkyl group, a C$_1$–C$_{10}$-alkoxy group, a C$_6$–C$_{10}$-aryl group, a C$_6$–C$_{10}$-aryloxy group, a C$_2$–C$_{10}$-alkenyl group, a C$_7$–C$_{40}$-arylalkyl group or a C$_8$–C$_{40}$-arylalkenyl group, R$^{18}$ is

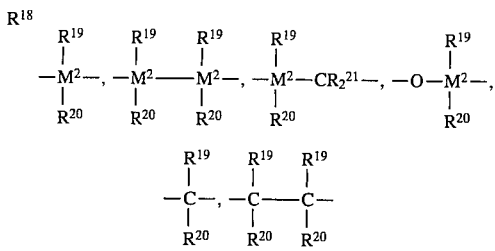

=BR$^{19}$, =AlR$^{19}$, —Ge—, —Sn—, —O—, —S—, =SO, =SO$_2$, =NR$^{19}$, =CO, =PR$^{19}$ or =P(O)R$^{19}$, where R$^{19}$, R$^{20}$ and R$^{21}$ are identical or different and are a hydrogen atom, a halogen atom, a C$_1$–C$_{10}$-alkyl group, a C$_1$–C$_{10}$-fluoroalkyl group, a C$_6$–C$_{10}$-fluoroalkyl group, a C$_6$–C$_{10}$-aryl group, a C$_1$–C$_{10}$-alkoxy group, a C$_2$–C$_{10}$-alkenyl group, a C$_7$–C$_{40}$-arylalkyl group, a C$_8$–C$_{40}$-arylalkenyl group or a C$_7$–C$_{40}$-alkylaryl group or R$^{19}$ and R$^{20}$ or R$^{19}$ and R$^{21}$ in each case form a ring with the atoms connecting them, M$^2$ is silicon, germanium or tin, wherein R$^{16}$ is a cyclopentadienyl group and R$^{17}$ is an indenyl group.

In the process of the invention, at least one polycyclic olefin of the formula I, II, III, IV, V or VI, preferably a cycloolefin of the formula I or III in which R$^1$, R$^2$, R$^3$, R$^4$, R$^5$, R$^6$, R$^7$ and R$^8$ are identical or different and are a hydrogen atom or a hydrocarbon radical, preferably a C$_6$–C$_{10}$-aryl radical or a C$_1$–C$_8$-alkyl radical, where identical radicals in the various formulae can have different meanings, is polymerized.

If desired, a monocyclic olefin of the formula VII

in which n is a number from 2 to 10, is also used. Another comonomer is ethylene. If desired, an acyclic 1-olefin of the formula VIII

in which R$^9$, R$^{10}$, R$^{11}$ and R$^{12}$ are identical or different and are a hydrogen atom or a hydrocarbon radical, preferably a C$_6$–C$_{10}$-aryl radical and a C$_1$–C$_8$-alkyl radical, is also used. Preference is here given to propylene.

In particular, copolymers of polycyclic olefins, preferably of the formulae I and III, with ethylene are prepared.

Particularly preferred polycyclic olefins are norbornene and tetracyclododecene, and these can be substituted by (C$_1$–C$_6$)-alkyl. They are preferably copolymerized with ethylene; ethylene/norbornene copolymers are of particular importance.

The polycyclic olefin of the formula I, II, III, IV, V or VI is used in an amount from 0.1 to 99.9% by weight and the monocyclic olefin of the formula VIII is used in an amount from 0 to 99.9% by weight, in each case based on the total amount of monomers.

The concentration of the ethylene and any acyclic olefin used is determined by their solubility in the reaction medium at a given pressure and given temperature.

Polycyclic olefins, monocyclic olefins and acyclic olefins are to be taken to include mixtures of two or more olefins of the respective type. This means that tercopolymers and multicopolymers, in addition to polycyclic homopolymers and bicopolymers, can be prepared by the process of the invention. Copolymers of the cycloolefins of the formula VII with ethylene and, if desired, the acyclic olefins of the formula VIII can also be advantageously prepared by the process described.

Of the cycloolefins of the formula VII, preference is given to cyclopentene, which may be substituted.

The catalyst to be used in the process of the invention comprises at least one cocatalyst and at least one metallocene (transition metal component) of the formula XI

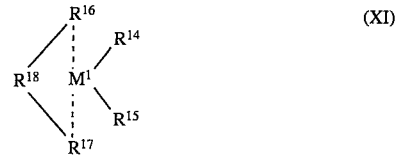

In the formula XI, M$^1$ is a metal selected from the group comprising titanium, zirconium, hafnium, vanadium, niobium and tantalum, preferably zirconium and hafnium. Particular preference is given to using zirconium.

R$^{14}$ and R$^{15}$ are identical or different and are a hydrogen atom, a C$_1$–C$_{10}$—, preferably C$_1$–C$_3$-alkyl group, a C$_1$–C$_{10}$—, preferably C$_1$–C$_3$-alkoxy group, a C$_6$–C$_{10}$—, preferably C$_6$–C$_8$-aryl group, a C$_6$–C$_{10}$—, preferably C$_6$–C$_8$-aryloxy group, a C$_2$–C$_{10}$—, preferably C$_2$–C$_4$-alkenyl group, a C$_7$–C$_{40}$—, preferably C$_7$–C$_{10}$-arylalkyl group, a C$_7$–C$_{40}$—, preferably C$_7$–C$_{12}$-alkylaryl group, a C$_8$–C$_{40}$—, preferably C$_8$–C$_{12}$-arylalkenyl group or a halogen atom, preferably chlorine.

R$^{16}$ is cyclopentadienyl group and R$^{17}$ is an indenyl group, where, if desired, one or both of the radicals R$^{16}$ and R$^{17}$ bears one or more radicals R$^{22}$ which are identical or different and R$^{22}$ is a C$_1$–C$_{10}$—, preferably C$_2$–C$_4$-alkyl group, a C$_1$–C$_{10}$—, preferably C$_1$–C$_3$-alkoxy group, a C$_6$–C$_{10}$—, preferably C$_6$–C$_8$-aryl group, a C$_6$–C$_{10}$—, preferably C$_6$–C$_8$-aryloxy group, a C$_2$–C$_{10}$—, preferably C$_2$–C$_4$-alkenyl group, a C$_7$–C$_{10}$—, preferably C$_7$–C$_{10}$-arylalkyl group, a C$_7$–C$_{40}$—, preferably C$_7$–C$_{22}$-alkylaryl group, a C$_8$–C$_{40}$—, preferably C$_8$–C$_{12}$-arylalkenyl group, or at least two adjacent radicals R$^{22}$ of the indenyl group R$^{17}$ together form a ring system.

In the case of a substituted indenyl group R$^{17}$, the 2, 4, 5, 6 and 7 positions are preferably substituted. If the radicals R$^{22}$ of the indenyl group R$^{17}$ together form a ring system, this can be monocylcic or polycyclic and also bear substituents.

R$^{18}$ is a single-membered or multi-membered bridge which links the radicals R$^{16}$ and R$^{17}$ and is preferably

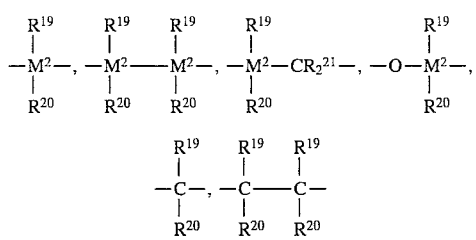

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-alkyl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^{19}$ and $R^{20}$ or $R^{19}$ and $R^{21}$ in each case form a ring with the atoms connecting them.

Preferably $R^{18}$ is a radical

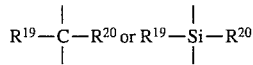

and particularly preferably is

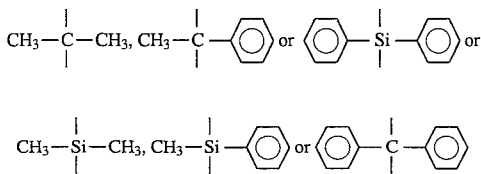

$M^2$ is silicon, germanium or tin, preferably silicon or germanium, particularly preferably silicon.

Metallocenes which are preferably used are:

isopropylene-(1-indenyl)cyclopentadienylzirconium dichloride, isopropylene-(1-indenyl)-2-methylcyclopentadienylzirconium dichloride, ethylene-(1-indenyl)cyclopentadienylzirconium dichloride, methylphenylmethylene-(1-indenyl)cyclopentadienylzirconium dichloride, diphenylmethylene-(1-indenyl)cyclopentadienylzirconium dichloride, diphenylmethylene-(1-(5-isopropyl)indenyl)cyclopentadienylzirconium dichloride, dimethylsilyl-(1-indenyl)cyclopentadienylzirconium dichloride, methylphenylsilyl-(1-indenyl)cyclopentadienylzirconium dichloride, diphenylsilyl-(1-indenyl)cyclopentadienylzirconium dichloride, isopropylene-(1-indenyl)cyclopentadienylzirconium dichloride, isopropylene-(1-indenyl)-2-methylcyclopentadienyltitanium dichloride, methylphenylmethylene-(1-indenyl)cyclopentadienyltitanium dichloride, diphenylmethylene-(1-indenyl)cyclopentadienyltitanium dichloride, dimethylsilyl-(1-indenyl)cyclopentadienyltitanium dichloride, methylphenylsilyl-(1-indenyl)cyclopentadienyltitanium dichloride, diphenylsilyl-(1-indenyl)cyclopentadienyltitanium dichloride, dimethylsilyl-(4,5-benzo-1-indenyl) cyclopentadienylzirconium dichloride, diphenylmethylene-(4,5-benzo-1-indenyl) cyclopentadienylzirconium dichloride, dimethyl-(4,5-benzo-1-indenyl)(methyl-1-cyclopentadienyl)zirconium dichloride, isopropylene-(4,5-benzo-1-indenyl)cyclopentadienylzirconium dichloride, isopropylene-(2-methyl-4,5-benzo-1-indenyl)-cyclopentadienylzirconium dichloride or mixtures of at least two of these metallocenes.

Particular preference is given to:

isopropylene-(1-indenyl)cyclopentadienylzirconium dichloride.

The cocatalyst is preferably an aluminoxane, in particular of the formula IX

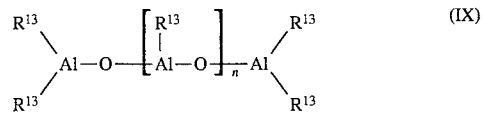

for the linear type and/or of the formula X

for the cyclic type, where, in the formulae IX and X, $R^{13}$ are identical or different and are a $C_1$–$C_6$-alkyl group, phenyl or benzyl and n is an integer from 2 to 50. The $C_1$–$C_6$-alkyl group is preferably methyl, ethyl or isobutyl, butyl or neopentyl, particularly preferably methyl. n is an integer from 0 to 50, preferably from 5 to 40.

The aluminoxane can be prepared in various ways by known processes. One of the methods is, for example, reacting an aluminum hydrocarbon compound and/or a hydridoaluminum hydrocarbon compound with water (gaseous, solid, liquid or bound, for example as water of crystallization) in an inert solvent (such as toluene). To prepare an aluminoxane having different alkyl groups $R^{13}$, two different trialkylaluminums ($AlR_3+AlR'_3$) are reacted with water, in accordance with the desired composition (S. Pasynkiewicz, Polyhedron 9 (1990), 429, EP-A 302, 424).

The exact steric structure of the aluminoxanes is not known.

Regardless of the method of preparation, all aluminoxane solutions have in common a varying content of unreacted aluminum starting compound which is present in free form or as an adduct.

It is also possible to apply the aluminoxane to a support and to then use it as a suspension in support form. A number of processes are known for applying it to a support (EP 92107331.8), for example, silica gel can function as support.

It is possible to preactivate the metallocene with a cocatalyst, particularly an aluminoxane, prior to use in the polymerization reaction. The polymerization activity is thereby significantly increased.

The preactivation of the transition metal compound is carried out in solution. The metallocene is here preferably dissolved in a solution of the aluminoxane in an inert hydrocarbon. Suitable inert hydrocarbons are aliphatic or aromatic hydrocarbons. Preference is given to using toluene.

The concentration of the aluminoxane in the solution lies in the range from about 1% by weight to the saturation limit, preferably from 5 to 30% by weight, in each case based on the total solution. The metallocene can be used in the same concentration, but it is preferably used in an amount from $10^{-4}$–1 mole per mole of aluminoxane. The preactivation time is from 5 minutes to 60 hours, preferably from 5 to 60 minutes. Preactivation is carried out at a temperature from −78° C. to 100° C., preferably from 0° to 70° C.

They can also be prepolymerized or applied to a support. For prepolymerization, the (or one of the) olefin(s) used in the polymerization is preferably employed.

Suitable supports are, for example, silica gels, aluminum oxides, solid aluminoxane or other inorganic support materials. Another suitable support material is a polyolefin powder in finely divided form.

A further possible embodiment of the process of the invention comprises using, in place of or in addition to an aluminoxane, a salt-like compound of the formula $R_xNH_{4-x}BR'_4$ or of the formula $R_3PHBR'_4$ as cocatalyst. Here, x=1, 2 or 3, R=alkyl or aryl, identical or different, and R'=aryl which can also be fluorinated or partially fluorinated. In this case, the catalyst comprises the reaction product of a metallocene with one of the specified compounds (EP-A 277 004).

If solvent is added to the reaction mixture, then it is a conventional inert solvent such as, for example, an aliphatic or cycloaliphatic hydrocarbon, a petroleum fraction or hydrogenated diesel oil fraction or toluene.

The metallocenes are preferably used in the form of their racemates. The metallocene compound is used in a concentration, based on the transition metal, from $10^{-3}$ to $10^{-8}$, preferably from $10^{-4}$ to $10^{-7}$, mole of transition metal per $dm^3$ of reactor volume. The aluminoxane is used in a concentration from $10^{-4}$ to $10^{-1}$, preferably from $10^{-4}$ to $2\times10^{-2}$, mole per $dm^3$ of reactor volume, based on the aluminum content. However, higher concentrations are also possible in principle.

In the preparation of copolymers, the molar ratio of the polycyclic olefin to the open-chain olefin used can be varied over a wide range. Preference is given to using molar ratios from 3:1 to 100:1 of cycloolefin to open-chain olefin. Selection of the polymerization temperature, the concentration of the catalyst components and the molar ratio used and pressure of the gaseous open-chain olefin allows the incorporated amount of comonomer to be controlled to almost any value desired. Preference is given to the incorporation of between 20 and 80 mol % of the cyclic components and particular preference is given to the incorporation of between 40 and 60 mol % of the cyclic components.

The polymerization can also be carried out in a number of stages, by which means block copolymers can also be formed (P 42 05 416.8).

The average molecular weight of the polymer formed can furthermore be controlled in a known manner by metering-in of hydrogen, variation of the catalyst concentration or variation of the temperature.

The polydispersity $M_w/M_n$ of the copolymers is very narrow, with values from 1.9–3.5. This results in a property profile which makes these polymers particularly suitable for injection molding.

The process described can be used to prepare amorphous cycloolefin copolymers which contain no partly crystalline ethylene polymers. The copolymers are transparent, hard and can be thermoplastically processed. The tensile strengths (in accordance with DIN 53457) lie in the range from 50 to 100MPa, preferably between 55 and 70 MPa. Both in extrusion and also in injection molding, no decomposition reactions or viscosity degradation were found at temperatures of 300° C.

The materials prepared according to the invention are particularly suitable for the production of extruded parts such as films, hoses, pipes, rods and fibers are also for the production of injection-molded articles of any desired shape and size. An important property of the materials of the invention is their transparency. This makes the optical applications of the extruded or injection-molded parts made from these materials of particularly great importance. The refractive index determined with a Abbe refractometer and mixed light of the reaction products described in the following examples lies in the range between 1.520 and 1.555. Since the refractive index lies very close to that of crown glass (n=1.51), the products of the invention can be used as glass substitutes in various applications such as, for example, lenses, prisms, substrate boards and films for optical data storage, for video disks, for compact disks, as covering and focusing sheets for solar cells, as covering and dispersing disks for power optics, as optical waveguides in the form of fibers or films.

In impact modified form, the materials of the invention can be used as structural materials in various industrial areas (P 42 13 219.3).

The polymers of the invention can also be used for the preparation of polymer alloys. The alloys can be prepared in the melt or in solution. The alloys have, in each case, a favorable property combination of the components for certain applications. The following polymers can be used for alloys with the polymers of the invention.

polyethylene, polypropylene, (ethylene/propylene) copolymers, polybutylene, poly(4-methyl-1-pentene), polyisoprene, polyisobutylene, natural rubber, poly(methylmethacrylate), other polymethacrylates, polyacrylates, (acrylate/methacrylate) copolymers, polystyrene, (styrene/acrylonitrile) copolymers, bisphenol-A polycarbonate, other polycarbonates, aromatic polyester carbonates, polyethylene terephthalate, polybutylene terephthalate, amorphous polyarylates, nylon-6, nylon-66, other polyamides, polyaramides, polyether ketones, polyoxymethylene, polyoxyethylene, polyurethanes, polysulfones, polyether sulfones, polyvinylidene fluoride.

The glass transition temperature $T_g$ given in the following examples were determined by means of DSC (Differential Scanning Calorimetry) at a heating rate of 20° C./min. The viscosity numbers given were determined in accordance with DIN 53 728.

EXAMPLE 1

A 1.5 $dm^3$ reactor was charged with ethylene and 600 $cm^3$ of an 85% by weight strength solution of norbornene in toluene were added. By multiple pressurization with ethylene (6 bar), the solution was saturated with ethylene. The pressure was set to 6.0 bar (gauge pressure), 5 $cm^3$ of methylaluminoxane solution in toluene (10.1% by weight of methylaluminoxane having a cryoscopically determined molecular weight of 1300 g/mol) were introduced into the reactor and the mixture was stirred for 15 minutes at 70° C. A solution of 1.5 mg of isopropylene(1-indenyl)cyclopentadienylzirconium dichloride in 5 $cm^3$ of methylaluminoxane solution in toluene was added after 15 minutes' preparation. (To regulate the molecular weight, hydrogen can be added prior to the addition of catalyst).

The mixture was polymerized at 70° C. for one hour while stirring (750 rpm), the ethylene pressure being maintained at 6.0 bar by metering in further amounts.

The reaction solution was drained into a vessel and quickly introduced into 5 $dm^3$ of acetone, the mixture was stirred for 10 minutes and subsequently the precipitated product was filtered off. The filter cake was washed a number of times alternately with 10% strength hydrochloric acid and acetone. Finally the cake was washed to neutrality and stirred with acetone. The polymer thus washed is filtered off and dried at 80° C. at a pressure of 0.2 bar for 15 hours.

41 g of a colorless polymer were obtained. A viscosity number of 67 cm/g and a glass transition temperature of 197° C. were measured on the polymer. No melting peak could be found by thermal analysis (DSC) between 20° C. and 220° C.

EXAMPLE 2

Comparative Example for Example 1

A 1.5 dm$^3$ reactor was charged with ethylene and 575 cm$^3$ of an 85% by weight strength solution of norbornene in toluene were added. By multiple pressurization with ethylene (6 bar), the solution was saturated with ethylene. The pressure was set to 6.0 bar (gauge pressure), 5 cm$^3$ of methylaluminoxane solution in toluene (10.1% by weight of methylaluminoxane having a cryoscopically determined molecular weight of 1300 g/mol) were introduced into the reactor and the mixture was stirred for 15 minutes at 70° C. A solution of 10.0 mg of rac dimethylsilyl-bis(1-indenyl)zirconium dichloride in 5 cm$^3$ of methylaluminoxane solution in toluene was added after 15 minutes' preactivation. (To regulate the molecular weight, hydrogen can be added prior to the addition of catalyst).

The mixture was polymerized at 70° C. for one hour while stirring (750 rpm), the ethylene pressure being maintained at 6.0 bar by metering in further amounts.

The reaction mixture was drained into a vessel and quickly introduced into 5 dm$^3$ of acetone, the mixture was stirred for 10 minutes and subsequently the precipitated product was filtered off. The filter cake was washed a number of times alternately with 10% strength hydrochloric acid and acetone. Finally the cake was washed to neutrality and stirred with acetone. The polymer thus washed is filtered off and dried at 80° C. at a pressure of 0.2 bar for 15 hours.

23 g of a milky-white polymer were obtained. A viscosity number of 123 cm$^3$/g and a glass transition temperature of 175° C. were measured on the polymer. Thermal analysis (DSC) gave a melting peak at 127° C. which corresponds to a heat of fusion of 0.540 J/g and can be attributed to partly crystalline ethylene polymers.

EXAMPLE 3

A dry 75 dm$^3$ polymerization reactor fitted with stirrer was flushed with nitrogen and then with ethylene and charged with 27.2 kg of norbornene melt at 80° C. While stirring, the reactor was maintained at a temperature of 80° C. and pressurized with 20 bar of ethylene (gauge pressure).

500 cm$^3$ of methylaluminoxane solution in toluene (10.1% by weight of methylaluminoxane having a cryoscopically determined molecular weight of 1300 g/mol) were then metered into the reactor and the mixture stirred at 80° C. for 15 minutes, the ethylene pressure being maintained at 20 bar by metering in further amounts. In parallel thereto, 32 mg of isopropylene(1-indenyl)cyclopentadienylzirconium dichloride were dissolved in 500 cm$^3$ of methylaluminoxane solution in toluene and preactivated by allowing to stand for 15 minutes. The solution of the complex was then metered into the reactor. Polymerization was then carried out at 80° C. for 1.1 hours while stirring (750 rpm), the ethylene pressure being maintained at 20 bar by metering in further amounts.

The reactor contents were then quickly drained into a stirred vessel which ha been charged with 200 cm$^3$ of isopropanol (as terminator). The mixture was precipitated in 500 dm$^3$ of acetone, stirred for 10 minutes and subsequently filtered.

The polymer separated off was then admixed with a mixture of two parts of 3N hydrochloric acid and 1 part of ethanol and the mixture was stirred for 2 hours. After being again filtered off, the polymer was washed to neutrality with water and dried at 80° C. and a pressure of 0.2 bar for 15 hours.

7.4 kg of a colorless polymer were obtained. A viscosity number of 66 cm$^3$/g and a glass transition temperature ($T_g$) of 155° C. were measured. No melting peak could be found by thermal analysis (DSC) between 20° C. and 250° C.

EXAMPLE 4

A 1.5 dm$^3$ reactor was charged with ethylene and 600 cm$^3$ of an 85% by weight strength solution of norbornene in toluene were added. By multiple pressurization with ethylene (1 bar), the solution was saturated with ethylene. The pressure was set to 1.0 bar (gauge pressure), 5 cm$^3$ of methylaluminoxane solution in toluene (10.1% by weight of methylaluminoxane having a cryoscopically determined molecular weight of 1300 g/mol) were introduced into the reactor and the mixture was stirred for 15 minutes at 70° C. A solution of 1.0 mg of isopropylene(1-indenyl)cyclopentadienylzirconium dichloride in 5 cm$^3$ of methylaluminoxane solution in toluene was added after 15 minutes' preactivation. (To regulate the molecular weight, hydrogen can be added prior to the addition of catalyst).

The mixture was polymerized at 70° C. for one hour while stirring (750 rpm), the ethylene pressure being maintained at 1.0 bar by metering in further amounts.

The reaction solution was drained into a vessel and quickly introduced dropwise into 5 dm$^3$ of acetone, the mixture was stirred for 10 minutes and subsequently the precipitated product was filtered off. The filter cake was washed a number of times alternately with 10% strength hydrochloric acid and acetone. Finally the cake was washed to neutrality and stirred with acetone. The polymer thus washed is filtered off and dried at 80° C. at a pressure of 0.2 bar for 15 hours.

12 g of a colorless polymer were obtained. A viscosity number of 40 cm$^3$/g and a glass transition temperature of 239° C. were measured on the polymer. No melting peak could be found by thermal analysis (DSC) between 20° C. and 250° C.

EXAMPLE 5

A 1.5 dm$^3$ reactor was charged with ethylene and 600 cm$^3$ of an 85% by weight strength solution of norbornene in toluene were added. By multiple pressurization with ethylene (6 bar), the solution was saturated with ethylene. The pressure was set to 6.0 bar (gauge pressure), 5 cm$^3$ of methylaluminoxane solution in toluene (10.1% by weight of methylaluminoxane having a cryoscopically determined molecular weight of 1300 g/mol) were introduced into the reactor and the mixture was stirred for 15 minutes at 70° C. A solution of 5.3 mg of isopropylene(1-indenyl)-3-methylcyclopentadienylzirconium dichloride (1:1 mixture of racemic and meso form) in 5 cm$^3$ of methylaluminoxane solution in toluene was added after 15 minutes' preactivation. (To regulate the molecular weight, hydrogen can be added prior to the addition of catalyst).

The mixture was polymerized at 70° C. for one hour while stirring (750 rpm), the ethylene pressure being maintained at 6.0 bar by metering in further amounts.

The reaction solution was drained into a vessel and quickly introduced into 5 dm³ of acetone, the mixture was stirred for 10 minutes and subsequently the precipitated product was filtered off. The filter cake was washed a number of times alternately with 10% strength hydrochloric acid and acetone. Finally the cake was washed to neutrality and stirred with acetone. The polymer thus washed is filtered off and dried at 80° C. at a pressure of 0.2 bar for 15 hours.

56g of a colorless polymer were obtained. A viscosity number of 95 cm³/g and a glass transition temperature of 168° C. were measured on the polymer. No melting peak could be found by thermal analysis (DSC) between 20° C. and 250° C.

EXAMPLE 6

A 1.5 dm³ reactor was charged with ethylene and 600 cm³ of an 85% by weight strength solution of norbornene in toluene were added. By multiple pressurization with ethylene (6 bar), the solution was saturated with ethylene. The pressure was set to 6.0 bar (gauge pressure), 5 cm³ of methylaluminoxane solution to toluene (10.1% by weight of methylaluminoxane having a cryoscopically determined molecular weight of 1300 g/mol) were introduced into the reactor and the mixture was stirred for 15 mixture at 70° C. A solution of 1.5 mg of dimethylsilyl(1-indenyl)cyclopentadienylzirconium dichloride in 5 cm² of methylaminoxane solution in toluene was added after 15 minutes' preactivation. (To regulate the molecular weight, hydrogen can be added prior to the addition of catalyst).

The mixture was polymerized at 70° C. for one hour while stirring (750 rpm), the ethylene pressure being maintained at 6.0 bar by metering in further amounts.

The reaction solution was drained into a vessel and quickly introduced dropwise into 5 dm³ of acetone, the mixture was stirred for 10 minutes and subsequently the precipitated product was filtered off. The filter cake was washed a number of times alternately with 10% strength hydrochloric acid and acetone. Finally the cake was washed to neutrality and stirred with acetone. The polymer thus washed is filtered off and dried at 80° C. at a pressure of 0.2 bar for 15 hours.

16 g of a colorless polymer were obtained. A viscosity number of 46 cm³/g and a glass transition temperature of 215° C. were measured on the polymer. No heat of fusion could be measured by thermal analysis (DSC).

EXAMPLE 7

Comparative Example for Example 1

A 1.5 dm³ reactor was charged with ethylene and 600 cm³ of an 85% by weight strength solution of norbornene in toluene were added. By multiple pressurization with ethylene (6 bar), the solution was saturated with ethylene. The pressure was set to 6.0 bar (gauge pressure), 5 cm³ of methylaluminoxane solution in toluene (10.1% by weight of methylaluminoxane having a cryoscopically determined molecular weight of 1300 g/mol) were introduced into the reactor and the mixture was stirred for 15 minutes at 70° C. A solution of 2.7 mg of diphenylmethylene(9-fluorenyl)cyclopentadienylzirconium dichloride in 5 cm³ of methylaluminoxane solution in toluene was added after 15 minutes' preactivation.

The mixture was polymerized at 70° C. for one hour while stirring (750 prm), the ethylene pressure being maintained at 6.0 bar by metering in further amounts.

The reaction solution was drained into a vessel and quickly introduced dropwise into 5 dm³ of acetone, the mixture was stirred for 10 minutes and subsequently the precipitated product was filtered off.

The solid obtained was washed a number of times alternately with 10% strength hydrochloric acid and acetone. It was washed to neutrality and stirred again with acetone. The polymer was again filtered off and dried at 80° C. and a pressure of 0.2 bar for 15 hours.

59 g of a colorless polymer were obtained. A viscosity number of 172 cm³G and a glass transition temperature $T_g$ of 160° C. were measured (Table 1).

EXAMPLE 8

A 1.5 dm³ autoclave, which had previously been thoroughly flushed with ethene, is charged with 600 cm³ of an 85 percent by weight strength solution of norbornene in toluene. By multiple pressurization with ethene (6 bar), the solution was saturated with ethene. Into the reactor thus prepared, 5 cm³ of methylaluminoxane solution in toluene (10.1 percent by weight strength methylaluminoxane solution having a cryoscopically determined molecular weight of 1300 g/mol) were metered in countercurrent and the mixture was stirred at 70° C. for 30 minutes. A solution of 1.0 mg of isopropylene (4,5-benzo-1-indenyl) cyclopentadienylzirconium dichloride in 5 cm³ of methylaluminoxane solution in toluene was added after 15 minutes' preactivation. (In the case of regulation with hydrogen, the autoclave can be pressurized with hydrogen at this stage).

The mixture was polymerized for one hour while stirring (750 rpm), the ethene pressure being maintained at 6 bar (6 bar gage pressure) by metering in further amounts. After the end of the reaction time, the polymerization mixture was drained into a vessel and immediately introduced into 5 dm³ of acetone, the mixture was stirred for 10 minutes and subsequently the precipitated product was filtered off. The filter cake was washed alternately with 3 portions each of 10 percent strength hydrochloric acid and acetone. Finally it was washed to neutrality with water, the residue was slurried in acetone and again filtered. The polymer thus purified was dried at 80° C. in vacuo (0.2 bar) for 15 hours.

After drying, 12 g of colorless polymer were obtained, this having a glass transition temperature of 180° C. and a viscosity number of 96 cm³/g.

EXAMPLE 9

The procedure was as in Example 8, but using 4 mg of dimethylsilyl(4,5-benzo-1-indenyl)cyclopentadienylzirconium dichloride.

After drying, 4.8 g of colorless polymer were obtained, this having a glass transition temperature of 224° C. and a viscosity number of 56 cm³/g.

TABLE 1

| Ex. No. | Metallocene (Mc) | Temp. (°C.) | Pressure (bar) | Mass of Mc (mg) | Yield (g) | VN (cm³/g) | $T_g$ (°C.) | Method (Toluene) |
|---|---|---|---|---|---|---|---|---|
| 1 | A | 70 | 6 | 1.5 | 41 | 67 | 197 | 85% strength solution |
| 2 | B | 70 | 6 | 10 | 19 | 129 | 169 | 85% strength solution |
| 3 | A | 80 | 20 | 32 | 7400 | 66 | 155 | bulk |
| 4 | A | 70 | 1 | 1.0 | 12 | 40 | 239 | 85% strength solution |
| 5 | C | 70 | 6 | 5.3 | 56 | 95 | 168 | 85% strength solution |
| 6 | D | 70 | 6 | 8.5 | 16 | 46 | 215 | 85% strength solution |
| 7 | E | 70 | 6 | 1.8 | 59 | 172 | 160 | 85% strength solution |
| 8 | F | 70 | 6 | 1.0 | 12 | 96 | 180 | 85% strength solution |
| 9 | G | 70 | 6 | 4.0 | 4.8 | 56 | 224 | 85% strength solution |

Mc=metallocene

A=isopropylene-(1-indenyl)-cyclopentadienylzirconium dichloride

B=dimethylsilyl-bis-(1-indenyl)-zirconium dichloride

C=isopropylene-(1-indenyl)-3-methylcyclopentadienylzirconium dichloride

D=dimethylsilyl-(1-indenyl)-cyclopentadienylzirconium dichloride

E=diphenylmethylene-(9-fluorenyl)-cyclopentadienylzirconium dichloride

F=isopropylene(4,5-benzo-1-indenyl)-cyclopentadienylzirconium dichloride

G=dimethylsilyl(4,5-benzo-1-indenyl)cyclopentadienylzirconium dichloride

TABLE 2

Mechanical properties of the cycloolefin copolymers from Examples 1, 2, 7, 8 and 9; tensile test (DIN 53457, Instron 4302)

| | Polymer from Ex. 1 | Polymer from Ex. 2 | Polymer from Ex. 7 | Polymer from Ex. 8 | Polymer from Ex. 9 |
|---|---|---|---|---|---|
| Tensile strength [MPa] | 61.40 | 64.54 | 44.84 | 63.73 | 59.50 |
| Elongation at break [%] | 3.60 | 3.58 | 3.36 | 3.55 | 3.30 |

What is claimed is:

1. A process for preparing a cycloolefin copolymer by polymerization of from 0.1 to 99.9% by weight, based on the total amount of monomers, of at least one polycyclic olefin of the formula I, II, III, IV or VI

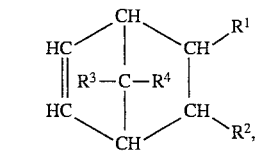

(I)

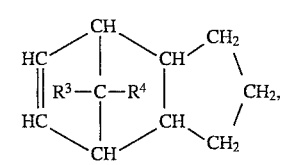

(II)

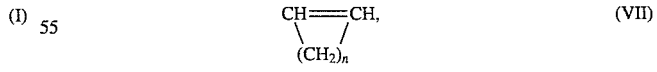

(III)

(IV)

(V)

(VI)

in which $R^1$, $R^2$, $R^3$, $R^4$, $R^5$, $R^6$, $R^7$ and $R^8$ are identical or different and are a hydrogen atom a $C_6$–$C_{10}$-aryl radical or a $C_1$–$C_8$-alkyl radical, where identical radicals in the various formulae can have different meanings, from 0 to 99.9% by weight, based on the total amount of the monomers, of a cycloolefin of the formula VII $$CH = CH$$
$$(CH_2)_n$$

(VII)

in which n is from 2 to 10, from 0.1 to 99.9% by weight, based on the total amount of monomers, of ethylene and from 0 to 99.9% by weight, based on the total amount of monomers, of at least one acyclic 1-olefin of the formula VII

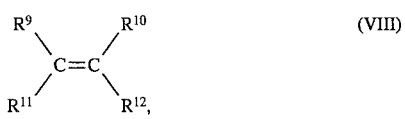

(VIII)

in which $R^9$, $R^{10}$, $R^{11}$ and $R^{12}$ are identical or different and are a hydrogen atom a $C_6$–$C_{10}$-aryl radical or a $C_1$–$C_8$-alkyl radical, at temperatures from 20° to 150° C. and a pressure from 0.01 to 64 bar, in the presence of a catalyst which comprises at least one cocatalyst and at least one metallocene of the formula XI

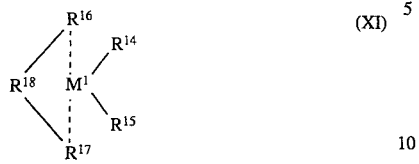 (XI)

in which

M$^1$ is titanium, zirconium, hafnium, vanadium, niobium or tantalum,

R$^{14}$ and R$^{15}$ are identical or different and are a hydrogen atom, a halogen atom, a C$_1$–C$_{10}$-alkyl group, a C$_1$–C$_{10}$-alkoxy group, a C$_6$–C$_{10}$-aryl group, a C$_6$–C$_{10}$-aryloxy group, a C$_2$–C$_{10}$-alkenyl group, a C$_7$–C$_{40}$-arylalkyl group or a C$_8$–C$_{40}$-arylalkenyl group, R$^{18}$ is

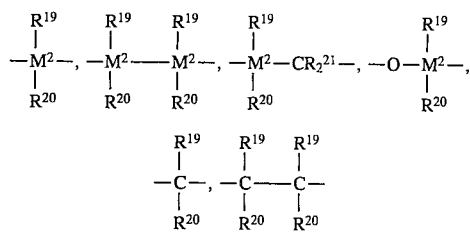

=BR$^{19}$, =AlR$^{19}$, —Ge—, —Sn—, —O—, —S—, =SO, =SO$_2$, =NR$^{19}$, =CO, =PR$^{19}$ or =P(O)R$^{19}$, where R$^{19}$, R$^{20}$ and R$^{21}$ are identical or different and are a hydrogen atom, a halogen atom, a C$_1$–C$_{10}$-alkyl group, a C$_1$–C$_{10}$-fluoroalkyl group, a C$_6$–C$_{10}$-fluoroalkyl group, a C$_6$–C$_{10}$-aryl group, a C$_1$–C$_{10}$-alkoxy group, a C$_2$–C$_{10}$-alkenyl group, a C$_7$–C$_{40}$-arylalkyl group, a C$_8$–C$_{40}$-arylalkenyl group or a C$_7$–C$_{40}$-alkylaryl group or R$^{19}$ and R$^{20}$ or R$^{19}$ and R$^{21}$ in each case form a ring with the atoms connecting them, M$^2$ is silicon, germanium or tin, wherein R$^{16}$ is a cyclopentadienyl group and R$^{17}$ is an indenyl group.

2. The process as claimed in claim 1, wherein polymerization is carried out in the liquid cycloolefin itself or in cycloolefin solution.

3. The process as claimed in claim 1, wherein the metallocene of the formula XI which is used is isopropylene-(1-indenyl)cyclopentadienylzirconium dichloride, isopropylene-(1-indenyl)-2-methylcyclopentadienylzirconium dichloride, ethylene-(1-indenyl)cyclopentadienylzirconium dichloride, methylphenylmethylene-(1-indenyl)cyclopentadienylzirconium dichloride, diphenylmethylene-(1-indenyl)cyclopentadienylzirconium dichloride, dimethylsilyl-(1indenyl)cyclopentadienylzirconium dichloride, methylphenylsilyl-(1-indenyl)cyclopentadienylzirconium dichloride, diphenylsilyl-(1-indenyl)cyclopentadienylzirconium dichloride, isopropylene-(1-indenyl)cyclopentadienyltitanium dichloride, isopropylene-(1-indenyl)-2-methylcyclopentadienyltitanium dichloride, methylphenylmethylene-(1-indenyl)cyclopentadienyltitanium dichloride, diphenylmethylene-(1-indenyl)cyclopentadienyltitanium dichloride, dimethylsilyl-(1-indenyl)cyclopentadienyltitanium dichloride, methylphenylsilyl-(1-indenyl)cyclopentadienyltitanium dichloride, diphenylsilyl-(1-indenyl)cyclopentadienyltitanium dichloride, dimethylsilyl-(4,5-benzo-1-indenyl) cyclopentadienylzirconium dichloride, diphenylmethylene-(4,5-benzo-1-indenyl) cyclopentadienylzirconium dichloride, dimethyl-(-4,5-benzo-1-indenyl)(methyl-1-cyclopentadienyl)zirconium dichloride, isopropylene-(4,5-benzo-1-indenyl)cyclopentadienylzirconium dichloride, isopropylene-(2-methyl-4,5-benzo-1-indenyl)-cyclopentadienylzirconium dichloride or mixtures of at least two of these catalysts.

4. The process as claimed in claim 1, wherein the cocatalyst used is an aluminoxane.

5. The process as claimed in claim 1, wherein the polycyclic olefin is norbornene or tetracyclododecene.

6. The process as claimed in claim 1, wherein a copolymer of norbornene and ethylene is prepared.

7. The process as claimed in claim 1, wherein at least one polycyclic olefin is of the formulas I or III, in which R$^1$, R$^2$, R$^3$, R$^4$, R$^5$, R$^6$, R$^7$ and R$^8$ are identical or different and are a hydrogen atom, a C$_6$–C$_{10}$-aryl radical or a C$_1$–C$_6$-alkyl radical where the same radicals can have different meaning in the various formulas.

8. The process as claimed in claim 7, wherein R$^9$, R$^{10}$, R$^{11}$ and R$^{12}$ are identical of different and are a hydrogen atom, C$_6$–C$_{10}$-aryl group or C$_1$–C$_8$-alkyl group.

9. The process as claimed in claim 8, wherein R$^9$, R$^{10}$, R$^{11}$ and R$^{12}$ are identical and are propylene.

10. The process as claimed in claim 1, wherein M$^1$ is zirconium or hafnium.

11. The process as claimed in claim 1, wherein R$^{14}$ and R$^{15}$ are identical or different and are a hydrogen atom, a C$_1$–C$_3$-alkyl group, a C$_1$–C$_3$-alkoxy group, a C$_6$–C$_8$-aryl group, a C$_2$–C$_4$-alkenyl group, a C$_7$–C$_{10}$-arylalkyl group, a C$_7$–C$_{12}$-alkylaryl group, a C$_8$–C$_{12}$-arylalkenyl group or a chlorine atom.

12. The process as claimed in claim 11, wherein M$^1$ is zirconium.

13. The process as claimed in claim 1, wherein said cocatalyst is an aluminoxane of formula IX

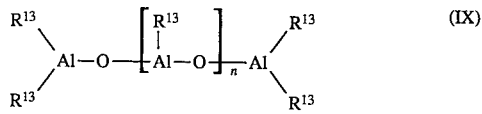 (IX)

for the linear type and/or of the formula X

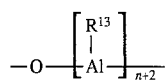

for the cyclic type where, in the formulae IX and X, $R^{13}$ are identical or different and are a $C_1$–$C_6$-alkyl group, phenyl or benzyl and n is an integer from 2 to 50, or of the formula $R_xNH_{4-x}BR'_4$ or of the formula $R_3PHBR'_4$ wherein x is 1 to 3, R is alkyl or aryl and R' is fluorinated, partially fluorinated or an unfluorinated aryl.

14. The process as claimed in claim 1, wherein said cocatalyst is aluminoxane, $R_xNH_{4-x}BR'_4$ or of the formula $R_3PHBR'_4$ wherein x is 1, 2 or 3, R is identical or different and is alkyl or aryl, and R' is aryl which can also be fluorinated or partially fluorinated.

* * * * *